United States Patent [19]

Mifune et al.

[11] 4,019,072
[45] Apr. 19, 1977

[54] PIEZOELECTRIC PRESSURE SENSOR

[75] Inventors: Hideo Mifune, Hirakata; Kenroku Tani, Katano; Tomohiko Niikawa, Hirakata, all of Japan

[73] Assignee: Matsushita Electric Industrial Co., Ltd., Osaka, Japan

[22] Filed: Mar. 17, 1975

[21] Appl. No.: 558,627

[30] Foreign Application Priority Data

May 20, 1974 Japan .............................. 49-57170

[52] U.S. Cl. .............................. 310/8.1; 310/8.7
[51] Int. Cl.[2] ................................. H01L 41/04
[58] Field of Search ............ 310/8.1, 8.2, 8.3, 8.5, 310/8.7, 9.1, 9.4; 340/244 R, 245–247; 73/141, 398, 61 R

[56] References Cited
UNITED STATES PATENTS

| | | | |
|---|---|---|---|
| 2,932,818 | 4/1960 | Lubkin | 340/244 R |
| 2,990,482 | 6/1961 | Kenny | 310/9.1 |
| 2,990,543 | 6/1961 | Rod | 340/244 R |
| 3,220,258 | 11/1965 | Rod | 340/244 R |
| 3,349,259 | 10/1967 | Kistler | 310/8.7 |
| 3,561,831 | 2/1971 | Alibert et al. | 310/8.7 |
| 3,736,632 | 6/1973 | Barrow | 310/8.2 X |
| 3,816,773 | 6/1974 | Baldwin et al. | 310/8.2 X |

*Primary Examiner*—Mark O. Budd
*Attorney, Agent, or Firm*—Stevens, Davis, Miller & Mosher

[57] ABSTRACT

A piezoelectric pressure sensor for detecting the amount of oil in an engine oil pan of an automobile, and liquid level or the amount of liquid such as water level in a water bath, makes use of the phenomenon that an impedance of an excited piezoelectric element varies between in a gas and in a liquid. The pressure sensor is insensitive to surrounding temperature, and has high response and is of simple construction.

3 Claims, 21 Drawing Figures

PIEZOELECTRIC PRESSURE SENSOR

The present invention relates to a pressure sensor for detecting the level or the amount of liquid in a vessel, and more particularly, to a pressure sensor suitable as a level sensor for use in an automobile.

It is a first object of the present invention to provide a pressure sensor operable without being affected by surrounding temperature and having a fast response.

In prior art pressure sensors, a semiconductor device such as thermistor was used in which the change in resistance of the semiconductor device due to temperature rise of the semiconductor device when it is out of liquid is detected by an electronic circuit or the like for detecting the level or amount of the liquid.

However, since such a prior art pressure sensors have made use of the temperature rise of the semiconductor device, it was directly influenced by the surrounding temperature, resulting in malfunction.

It is a second object of the present invention to provide a pressure sensor which permits the detection of the level and the amount of liquid in a vessel with a simple construction by using a piezoelectric element.

It is a third object of the present invention to provide a pressure sensor having improved resistance to humidity, resistance to heat and durability.

In accordance with the present invention the following advantages are offered:

1. Since the present sensor makes use of the change in the impedance of a piezoelectric element, it is not influenced by the surrounding temperature unlike the prior art sensors.
2. It has a fast response since it does not make use of temperature rise unlike the prior art sensors.
3. It is simple in construction.
4. Since it is of sealed structure, the piezoelectric element is not directly exposed in liquid or external atmosphere and hence the durability of the device is enhanced.

These and other objects, features and advantages of the present invention will become more apparent from the following description of the preferred embodiment of the present invention when take in conjunction with the accompanying drawings, in which.

Figure 1:
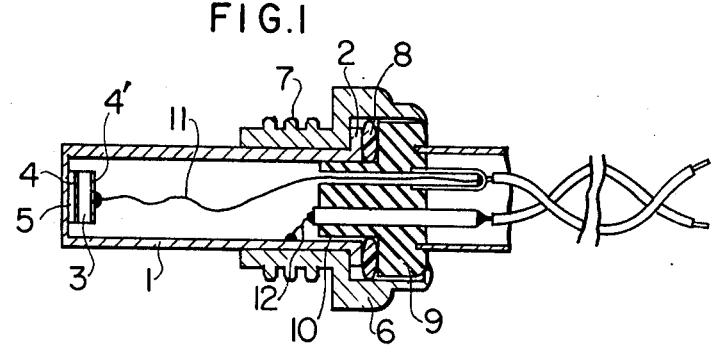
FIG. 1 is a sectional view of a pressure sensor in one embodiment of the present invention.

Now, referring to FIG. 1, the first embodiment of the present invention is explained.

In FIG. 1, the reference numeral 1 designates a metal tube having a closed end and opposite open end formed with an expanded portion 2, and 3 designates a piezoelectric element (comprising, for example, a piezoelectric ceramic plate) having electrodes 4, 4' mounted on opposite sides. The piezoelectric element 3 is bonded to an inner surface of a bottom of the tube 1 by an electrically conductive adhesive material 5. The piezoelectric element 3 need not necessarily be bonded to the bottom but it may be bonded to an inner surface of a side wall of the tube 1.

One electrode 4 of the piezolelectric element 3 and the tube 1 are electrically connected by the electrically conductive adhesive material 5. The numeral 6 designates a mounting screw having an aperture through which the tube 1 is inserted and a mounting thread 7 formed on an outer periphery thereof. The numeral 8 designates a ring-shaped packing and 9 designates a lid formed with a projection 10 to be fitted into the tube 1. Two leads 11 and 12 pass through the lid 9. The lead 11 is connected to the electrode 4' of the piezoelectric element 3 and the lead 12 is connected to the tube 1. As shown in FIG. 1, the tube 1 is fitted into the aperture in the mounting screw 6 to the extent that the expanded portion 2 engages with a shoulder of the mounting screw 6, and then the packing 8 and the lid 9 are inserted, and the end of the mounting screw 6 is bent to rigidly fix the tube 1 to the mounting screw 6.

The electrical characteristics of the piezoelectric element 3 will now be explained is conjunction with FIGS. 2 and 3.

Figure 2:
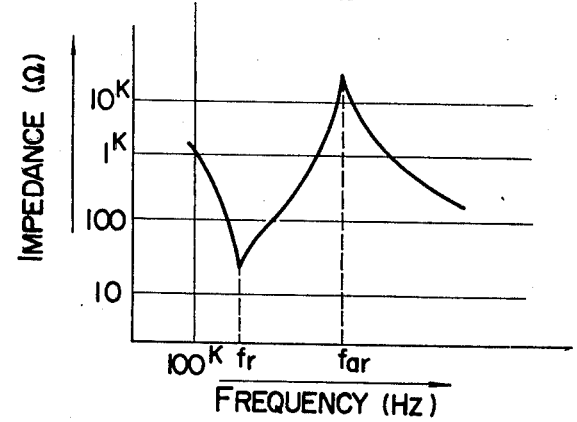
FIG. 2 shows a frequency characteristic of a piezoelectric element used in the pressure sensor of FIG. 1.
Figure 3:
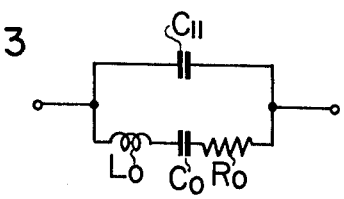
FIG. 3 is an electrical equivalent circuit of the piezoelectric element.

FIG. 2 shows the frequency characteristics of the piezoelectric element 3, which shows that an impedance of the piezoelectric element abruptly decreases at a resonant frequency $f_r$ and abruptly increases at an antiresonant frequency $f_{ar}$. FIG. 3 shows an electrical equivalent circuit in the vicinity of the resonant frequency $f_r$ of the piezolelectric element.

Figure 4A:
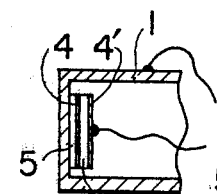
FIGS. 4A, 4B and 4C illustrate flexure vibration created when an A.C. signal is applied to the pressure sensor of the present invention.
Figure 4B:
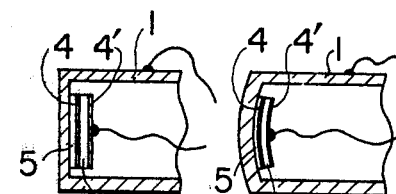
Figure 4C:
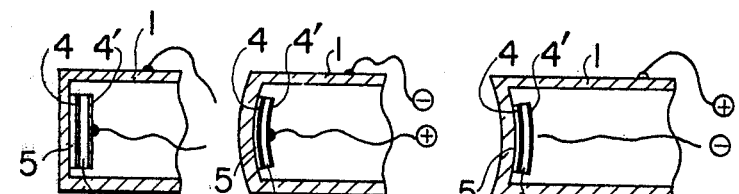

When an A.C. voltage is applied across the leads 11 and 12 of the pressure sensor shown in FIG. 1, the bottom of the tube 1 expands and shrinks with respect to the bonding surface of the piezoelectric element 3 and the tube 1 as shown in FIGS. 4A, 4B and 4C.

More particularly, assuming that the piezoelectric element 3 is polarized such that the side thereof facing the bonding surface is rendered positive, the piezoelectric element 3 shrinks as shown in FIG. 4B for a positive applied voltage and the bottom of the tube 1 expands outwardly, while for a negative applied voltage the piezoelectric element 3 expands and the bottom of the tube 1 shrinks inwardly as shown in FIG. 4C, with the result that a flexure vibration occurs at the bonding surface of the piezoelectric element 3 and the tube 1.

Figure 5:
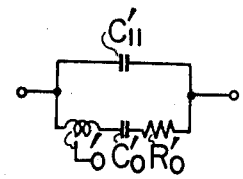
FIG. 5 shows an electrical equivalent circuit of the piezoelectric element when the pressure sensor is flexure vibrating.
Figure 6:
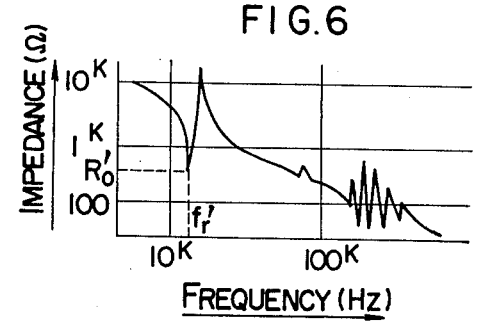
FIG. 6 shows a frequency characteristic of the piezoelectric element when the level sensor is flexure vibrating.

FIG. 5 shows an electrical equivalent circuit of a piezoelectric element 3 when the flexure vibration is occuring, and FIG. 6 shows a frequency characteristic of the piezoelectric element 3 when the flexure vibration is occuring. In FIG. 6, $f_r'$ designates a resonant frequency in the flexure vibration and $R_o'$ designates a resonant impedance.

Figure 7:
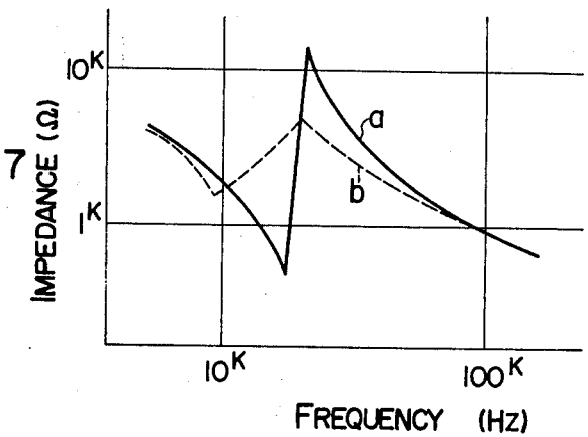
FIG. 7 shows frequency characteristics of the piezoelectric element when the pressure sensor is dipped in liquid and when it is not dipped in liquid.

When the tube 1 of the pressure sensor shown in FIG. 1 and having the above characteristics is dipped into liquid, the pressure of the liquid suppresses the flexure vibration so that the resonant impedance of the peizoelectric element 3 increases. That is, as shown in FIG. 7, while the piezoelectric element has a frequency characteristic as shown by $a$ when the tube is in air, the frequency characteristic changes to that shown by $b$ when the tube 1 is dipped in the liquid, increasing the resonant impedance.

The present invention contemplates to detect the level or amount of the liquid by detecting the change in the magnitude of the impedance of the piezoelectric element 3 when it is in air and when it is in the liquid.

Figure 8:
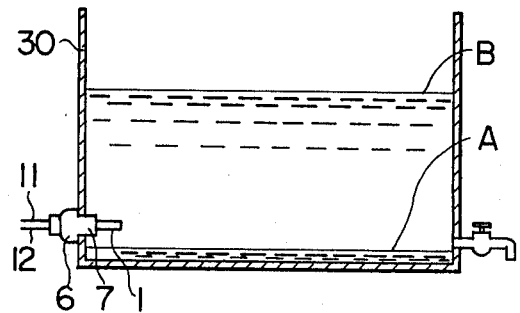
FIG. 8 is a sectional view illustrating the pressure sensor mounted to a liquid vessel.
Figure 9:
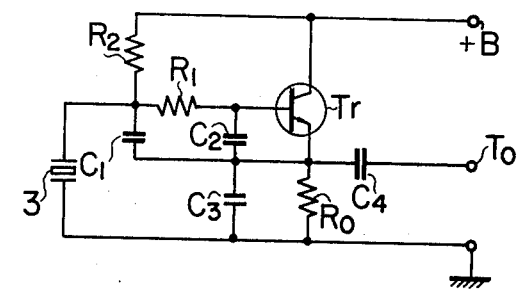
FIG. 9 shows an electrical wiring of an oscillator circuit connected to the pressure sensor.

FIG. 8 shows the pressure sensor of FIG. 1 mounted to a liquid vessel 30, and FIG. 9 shows an electrical circuit of a liquid level meter.

In FIG. 9, Tr designates an oscillating transistor which constitutes a part of a self oscillation circuit, 3 designates the piezoelectric element, $R_1$, $R_2$ and $R_3$ designate resistors in the self-oscillation circuit, and $C_1$, $C_2$, $C_3$ and $C_4$ designate capacitors.

Figure 10A:
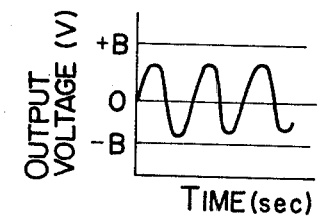
FIGS. 10A and 10B show waveforms of oscillator outputs of the oscillator circuit when high and low liquid pressures are applied to the pressure sensor.
Figure 10B:

FIGS. 10A and 10B show waveforms of the oscillation outputs for the liquid levels A and B, respectively, shown in FIG. 8. At the level A of FIG. 8, the tube 1 of the sensor is placed in air and an oscillation output of high amplitude as shown in FIG. 10A is produced. At the level B of FIG. 8 the oscillator circuit of FIG. 9 stops oscillating and the oscillation output is not produced as shown in FIG. 10B.

In this manner the level of the liquid in the vessel 30 can be detected by the magnitude of the amplitude of the oscillation output.

Figure 11:
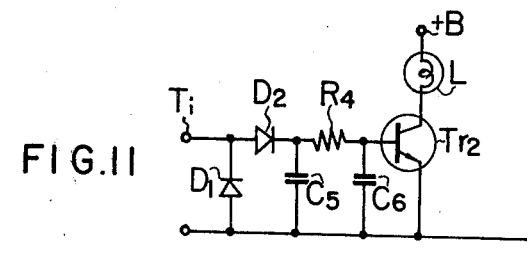
FIG. 11 shows an electrical wiring of an indicator circuit connected to the oscillator circuit of FIG. 9.

FIG. 11 shows an alarm-indicator circuit for signaling that the liquid level in the vessel 30 has reached a predetermined level by lighting a lamp or ringing a buzzer. In FIG. 11, $D_1$ and $D_2$ designate diodes constituting a rectifier-detection circuit, $R_4$, $C_5$ and $C_6$ designate a resistor and capacitors constituting a filtering circuit, $Tr_2$ designates a switching transistor, and L designates a lamp connected to the collector of the transistor $Tr_2$. An input terminal Ti of the indicator circuit of FIG. 11 is connected to an output terminal To of the oscillator circuit of FIG. 9.

When an oscillation output signal whose amplitude exceeds a predetermined level is applied to the input terminal Ti of FIG. 11, the signal is applied to the base of the transistor $Tr_2$ through the rectifier-detection circuit and the filtering circuit to render the transistor $Tr_2$ conductive and turn on the lamp L. When an oscillation output whose amplitude is below the predetermined level is applied to the input terminal Ti the lamp L is turned off. In this manner the level of the liquid in the vessel 30 can be detected by the turn-on or turn-off of the lamp L.

Figure 12:
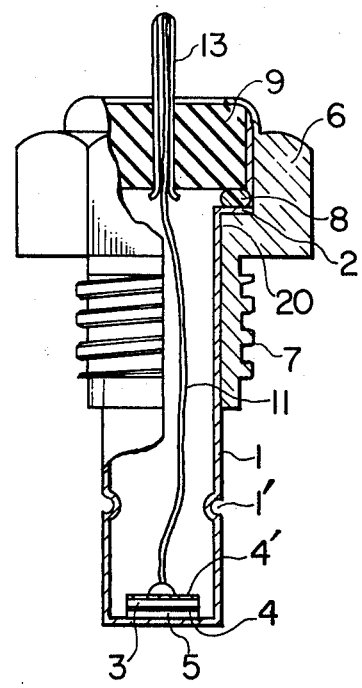
FIG. 12 shows a sectional view of a pressure sensor in a second embodiment of the present invention.

FIG. 12 shows a second embodiment of the present invention, in which the reference numeral 1 designate the metal tube having a closed end and an opposite open end formed with the expanded portion 2. The tube 1 is formed with a recessed portion 1' intermediate thereof. The numeral 3 designates the piezoelectric element having the electrodes 4, 4' arranged on opposite sides thereof. The piezoelectric element 3 is bonded to the inner surface of the bottom of the tube 1 by the electrically conductive adhesive material 5. One electrode 4 of the piezoelectric element 3 is electrically connected to the tube 1 by the electrically conductive adhesive material 5. The numeral 6 designates the support having the aperture through which the tube 1 is inserted and the mounting thread 7 formed on the outer periphery thereof. The tube 1 is inserted into the aperture in the support 6. The numeral 8 designates the ring-shaped packing, and 9 designates the lid fitted into the tube 1. A terminal 13 projects from the lid 9. One end of the lead 11 is connected to the electrode 4' of the piezoelectric element 3 and the other end thereof is connected to the terminal 13. As shown in FIG. 12, the tube 1 is fitted into the aperture of the support 6 to the extent that the expanded portion 2 engages with a shoulder 20 of the support 6, and then the packing 8 and the lid 9 are inserted, and the end of the support 6 is calked to rigidly fix the tube 1 to the support 6.

Figure 13:
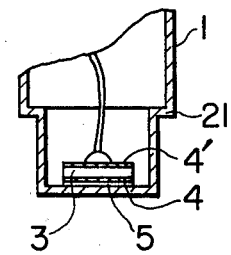
FIG. 13 shows a sectional view of a main part of a pressure sensor in a third embodiment of the present invention.

FIG. 13 shows a third embodiment of the present invention, in which a lower portion of the tube 1 is reduced in diameter to form a shoulder 21.

As shown in FIGS. 12 and 13, when a deformation section such as recess 1' shoulder 21 or projection is formed on the side of the tube, the calking force in fixing the tube to the mounting screw by calking the upper end of the mounting screw is not imparted on the bonding section of the piezoelectric ceramic plate so that the change of the characteristic of the piezoelectric element is prevented. The calking force is absorbed by the recess 1', shoulder 21 and projection.

Figure 14:
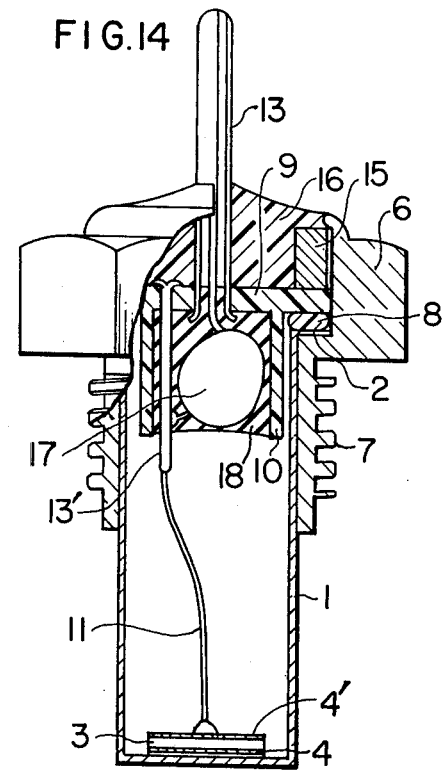
FIG. 14 shows a sectional view, partly broken away, of a liquid level detection section of a pressure sensor in a fourth embodiment of the present invention.

FIG. 14 shows a fourth embodiment of the present invention. The present invention is directed to a pressure sensor for liquid which gels below a certain temperature such as engine oil.

In FIG. 14, the numeral 1 designates the metal tube having a closed end and opposite open end formed with the expanded portion 2, 3 designates the piezoelectric element such as PCM (piezoelectric ceramic material) having the electrodes 4, 4' formed on opposite sides thereof. The piezoelectric element 3 is bonded to the inner surface of the bottom of the tube 1. The numeral 6 designates the mounting screw having the aperture through which the tube 1 is inserted and the mounting thread 7 formed on the periphery thereof. The tube 1 is supported by the mounting screw 6. The numeral 9 designates the lid made of resin, and at the bottom of the lid 9 a tubular container for a heat sensitive element is formed. Fixed within the container 10 by means of resin 18 is a heat sensitive element 17 such as a positive characteristic thermistor. The numerals 13 and 13' designate terminals projecting from the lid 9, and the leads from the heat sensitive element 17 are connected to the terminals 13 and 13', respectively. One electrode 4' of the piezoelectric element 3 and the terminal 13' are interconnected electrically via the lead 11. The lid 9 is positioned on the expanded portion 2 of the tube 1 with an elastic member 8 interleaved therebetween. The numeral 15 designates a ring disposed on the lid 9. After the ring 15 has been inserted to the aperture of the mounting screw 6, the upper end of the mounting screw 6 is calked to rigidly fix the lid 9 to the mounting screw 6. The numeral 16 designates resin injected into the aperture of the mounting screw 6.

The liquid level detector shown in FIG. 14 may be mounted at an aperture formed in a side wall of a bath near a bottom thereof, with the aid of the mounting screw 7 such that the lower end of the tube 1 projects into the inside of the bath.

Figure 15:
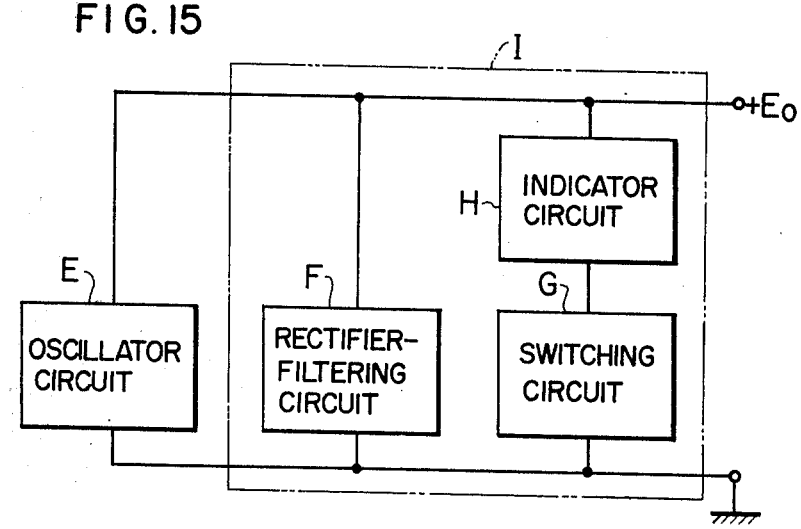
FIG. 15 is a block diagram of the pressure sensor shown in FIG. 14.

FIG. 15 shows a block diagram of an electrical circuit of a liquid level sensor to be connected to the level detector shown in FIG. 14. In FIG. 15, E designates an oscillator circuit including the piezoelectric element 3 and the heat sensitive element 17 shown in FIG. 14, F designates a rectifier-filtering circuit for rectifying and filtering an output signal from the oscillator circuit E, G designates a switching circuit which is turned on or off depending on the magnitude of the output level of the rectifier-filtering circuit F, and H designates an indicator circuit which may be a lamp adapted to be turned on and off in response to the turn-on and turn-off of the switching circuit G. The rectifier-filtering circuit F, the switching circuit G and the indicator circuit H constitute an output detector circuit I for the oscillator circuit E.

Figure 16:
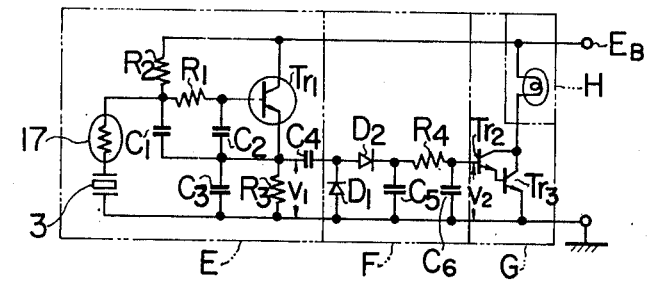
FIG. 16 shows a particular electrical circuit diagram of the block diagram shown in FIG. 15.

FIG. 16 shows a particular electrical circuit of the block shown in FIG. 15. In FIG. 16, the numeral 3 designates the piezoelectric element, 17 the heat sensitive element; $Tr_1$ an oscillating transistor; $R_1$, $R_2$ and $R_3$ resistors constituting a part of the oscillator circuit E; $C_1$, $C_2$ and $C_3$ capacitors constituting a part of the oscillator circuit E; $C_4$ a capacitor for blocking the D.C. component in the output from the oscillator circuit E; $D_1$ and $D_2$ diodes for voltage doubling rectifying the output signal of the oscillator circuit E; $R_4$, $C_5$ and $C_6$ a resistor and capacitors constituting filtering circuit; and $Tr_2$ and $Tr_3$ transistors constituting the switching circuit with transistors $Tr_2$ $Tr_3$ being connected in Darington configuration.

Figure 17:
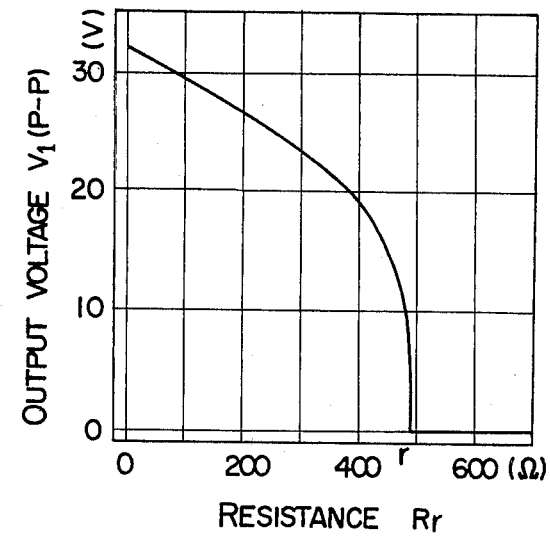
FIG. 17 shows a graph illustrating a relationship between resistance of a heat sensitive element of the pressure sensor and an output of the oscillator circuit.

FIG. 17 shows a relationship of the output voltage $V_1$ (peak-to-peak) of the oscillator circuit E with respect to the change in the resistance $R_r$ of the heat sensitive element due to the temperature change around the liquid level detector. When the resistance $R_r$ of the heat sensitive element 17 is less than $r$ ($R_r < r$) the oscillator circuit E oscillates while it does not oscillate when the resistance $R_r$ is larger than ($R_r > r$).

The operation of the present embodiment is explained below.

a. When the ambient temperature is below a given temperature and the resistance $R_r$ of the heat sensitive element 17 is larger than $r$ ($R_r > r$), the oscillator circuit E does not oscillate and the lamp L is turned off.

b. When the ambient temperature is above the given temperature and the resistance $R_r$ of the heat sensitive element 17 is smaller than $r$ ($R_r < r$), the oscillator circuit E is in its oscillating state, and;

b-1. When the liquid level of the bath shown in FIG. 8 is at B, the liquid pressure is applied to the tube 1 so that the flexure vibration of the piezoelectric element 3 is suppressed resulting in an increase in the resonant impedance of the piezoelectric element 3, which in turn results in a decrease in the amplitude of the oscillator output, leading to the turn-off of the switching circuit G and resulting turn-off of the lamp H, and b-2. When $R_r < r$ and the liquid level in the bath shown in FIG. 8 is at A, no liquid (pressure is applied to the tube 1 so that the flexure vibration of the piezoelectric element 3 is not suppressed and the amplitude of the oscillation output from the oscillator circuit E increases, leading to the turn-on of the switching circuit G and the turn-on of the lamp H.

Ordinary engine oil gels below a given temperature. With the engine oil gelled even when the liquid level is below a preset level, the gelled engine oil may deposit to the tube 1 and suppress the flexure vibration of the piezoelectric element 3. In such a case, the detector may malfunction as if the liquid level were above the preset level.

In the present embodiment such a malfunction is prevented by adding the heat sensitive element 17 to the oscillator circuit E. With this arrangement the detector of the liquid level below or above the preset level is allowed only when the ambient temperature has exceeded the given temperature. In this manner a possible malfunction due to gelled liquid is prevented in the present embodiment.

Figure 18:
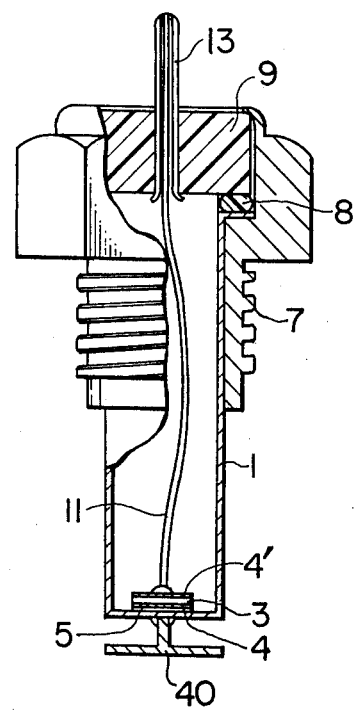
FIG. 18 shows a sectional view, partly broken away, of a pressure sensor in a fifth embodiment of the present invention.

FIG. 18 shows a further embodiment of the present invention, in which an anti-vibration member 40 is mounted on the bottom of the tube 1. The anti-vibration member 40 is shaped to present a wide surface area, such as a circular disc. When such anti-vibration member 40 is mounted on the bottom of the tube 1, since the bottom of the tube 1 vibrates integrally with the anti-vibration member 40, the surface area of the vibrating section increases so that the suppression of the vibration by the liquid is emhanced, with the result that a malfunction that may otherwise occur by insufficient suppression of the vibration by the liquid can be effectively prevented.

Although the present invention is described for those embodiments in which the level or the amount of liquid is detected, the present invention is also applicable to sense the change of the level of a powder of solid materials or the like.

What is claimed is:

1. A piezoelectric pressure sensor for detecting the level of a liquid in a vessel, comprising:
    an elongated tubular member having a closed end, an open end and a substantially hollow interior, a portion of said tubular member including said closed end extending into said vessel;
    a piezoelectric transducer bonded to the interior surface of said closed end of said tubular member;
    a cover member sealing the open end of said tubular member;
    A.C. signal generating means electrically coupled through said cover member to said piezoelectric transducer for exciting said transducer to cause the closed end of said tubular member to vibrate;
    detecting circuit means coupled to said transducer to detect changes in the impedance of said transducer as a function of changes in the environment in which said closed end of said tubular member is located between a substantially liquid and a substantially gaseous environment; and
    a temperature dependent impedance element located in said tubular member and electrically connected in series between said piezoelectric transducer and said A.C. signal generating means to prevent excitation of said transducer when the ambient temperature is below a predetermined value and to permit excitation of said transducer when the ambient temperature is above said predetermined value.

2. A piezoelectric pressure sensor for detecting the level of a liquid in a vessel, comprising:
an elongated tubular member having a closed end, an open end and a substantially hollow interior, a portion of said tubular member including said closed end extending into said vessel;
a piezoelectric transducer bonded to the interior surface of said closed end of said tubular member;
a cover member sealing the open end of said tubular member;
A.C. signal generating means electrically coupled through said cover member to said piezoelectric transducer for exciting said transducer to cause the closed end of said tubular member to vibrate;
detecting circuit means coupled to said transducer to detect changes in the impedance of said transducer as a function of changes in the environment in which said closed end of said tubular member is located between a substantially liquid and a substantially gaseous environment; and
an anti-vibration member fixed to the exterior of said closed end of said tubular member to effectively increase the exterior surface area of said closed end of said tubular member to thereby increase the vibration damping effect when said closed end of said tubular member is located in said liquid environment.

3. A piezoelectric pressure sensor according to claim 2, wherein said anti-vibration member comprises a substantially disc shaped member secured to said closed end of said tubular member in spaced apart relationship thereto.

* * * * *